(12) United States Patent
Gibbons et al.

(10) Patent No.: US 6,610,353 B1
(45) Date of Patent: Aug. 26, 2003

(54) METHOD OF APPLYING ADHESIVE TO ELECTROCHEMICAL CELL COMPONENTS

(75) Inventors: Daniel W. Gibbons, Southbury, CT (US); Michael Kolb, Southington, CT (US); Ilya Nizker, Peachtree City, GA (US); Leo White, Bristol, CT (US)

(73) Assignee: The Gillette Co., Boston, MA (US)

( * ) Notice: Subject to any disclaimer, the term of this patent is extended or adjusted under 35 U.S.C. 154(b) by 0 days.

(21) Appl. No.: 10/252,851

(22) Filed: Sep. 23, 2002

(51) Int. Cl.[7] .................................................. B05D 5/12
(52) U.S. Cl. ............................ 427/58; 156/60; 156/295; 156/325; 427/207.1; 427/208.6; 427/421
(58) Field of Search ......................... 427/207.1, 208.6, 427/421, 58; 156/60, 295, 325

(56) References Cited

U.S. PATENT DOCUMENTS

| | | |
|---|---|---|
| 4,954,059 A | 9/1990 | Lee |
| 5,458,721 A | 10/1995 | Raterman |
| 5,667,911 A * | 9/1997 | Yu et al. ............... 429/144 |
| 5,681,757 A | 10/1997 | Hayes |
| 6,436,156 B1 | 8/2002 | Wandeloski |

FOREIGN PATENT DOCUMENTS

| | | |
|---|---|---|
| EP | 0172709 B1 | 12/1987 |
| GB | 2177940 A | 2/1987 |

* cited by examiner

Primary Examiner—Bernard Pianalto
(74) Attorney, Agent, or Firm—Barry D. Josephs; Paul I. Douglas; Thomas G. Krivulka (57) ABSTRACT

A spray method of applying liquid adhesive to surfaces of components of an electrochemical cell. The adhesive is applied by spraying through a nozzle, preferably activated by a piezoelectric transducer. The nozzle can be an elongated resilient tube terminating in an outlet opening. The adhesive is preferably sprayed in a pulsed stream of droplets. The liquid adhesive is desirably dispensed in fine droplets at a rate of between about 500 and 5000 droplets per second. The method is effective in applying adhesive to narrow width or difficult to reach surfaces of cell components in a precise, consistent and reproducible manner. In a specific application the adhesive can be applied to the narrow recessed step surrounding the terminal portion of the cathode casing of a zinc/air button cell. In such application the adhesive provides a tight seal between the cathode casing and cathode assembly, thereby preventing leakage of electrolyte from the cell.

32 Claims, 4 Drawing Sheets

METHOD OF APPLYING ADHESIVE TO ELECTROCHEMICAL CELL COMPONENTS

FIELD OF THE INVENTION

The invention relates to a jet spray method of applying adhesive to components of an electrochemical cell. In particular the invention relates to a jet spray method of applying adhesive to the inside surface of the cathode casing of a zinc/air cell.

BACKGROUND

There is a need to apply adhesive to electrochemical cell components, for example, portions of the inside surface of the casing for the cell. The portions of surfaces to be coated with adhesive can be very narrow or otherwise difficult to access using convention brushes or contact rollers. Many cells, such as conventional zinc/$MnO_2$ alkaline cells include a plastic insulating plug which is inserted into an open end of the cell casing (housing) to seal the cell. There can be desirable benefits to applying adhesive sealant between the edge of such insulating plug and the cell casing, which is typically metallic. In such cells a metallic current collector in the form of an elongated nail is inserted through an aperture in the insulating plug so that the tip of the current collector passes into the anode mixture. It can be useful to apply adhesive sealant to the surface of the current collector or the insulating plug so that a tight seal develops when the current collector is inserted into the insulating plug. Conventional contact methods of applying the adhesive, for example, with brushes or rollers are usually slow or are difficult to apply to very narrow or difficult to reach surfaces.

Zinc/air depolarized cells are typically in the form of miniature button cells which have particular utility as batteries for electronic hearing aids including programmable type hearing aids. There can be a problem of leakage of electrolyte from such cells if they are not properly sealed, particularly if the cell is misused. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode cup), and a cathode casing (cathode cup). The anode casing and cathode casing each have a closed end an open end. After the necessary materials are inserted into the anode and cathode casings, the open end of the cathode casing is typically inserted over the open end of the anode casing and the cell sealed by crimping. The anode casing can be filled with a mixture comprising zinc, usually particulate zinc, with mercury optionally added to reduce gassing. The electrolyte is usually an aqueous solution of potassium hydroxide, however, other aqueous alkaline electrolytes can be used. The closed end of the cathode casing (when the casing is held in vertical position with the closed end on top) can have a raised portion near its center or a flat bottom. This portion forms the positive terminal and typically contains a plurality of air holes therethrough. Cathode casings with a raised center on the closed end usually have an integrally formed annular recessed step, which extends from and surrounds the raised positive terminal.

The cathode casing contains an air diffuser (air filter) which lines the inside surface of the raised portion (positive terminal contact area) at the casing's closed end. The air diffuser is placed adjacent to air holes in the raised portion of the casing closed end. Catalytic material typically comprising a mixture of particulate manganese dioxide, carbon and hydrophobic binder can be inserted into the cathode casing over the air diffuser on the side of the air diffuser not contacting the air holes. The cathode material can be part of a cathode catalytic assembly which is inserted into the cathode casing so that it covers the air diffuser (filter). The cathode catalytic assembly can be formed by laminating a layer of electrolyte barrier material (hydrophobic air permeable film), preferably Teflon (tetrafluoroethylene), to one side of the catalytic material and an electrolyte permeable (ion permeable) separator material to the opposite side. The cathode catalytic assembly is then typically inserted into the cathode casing so that its central portion covers the air diffuser and a portion of the electrolyte barrier layer rests against the inside surface of the step.

In high drain or other demanding services, electrolyte can migrate to the edge of the catalytic cathode assembly and leakage of electrolyte from the cathode casing can occur. The leakage, if occurring, tends to occur along the peripheral edge of the cathode catalytic assembly and the cathode casing and then gradually seep from the cell through the air holes at the cathode casing closed end. The potential for leakage is also greater when the cathode casing is made very thin. For example, having a wall thickness of between about 4 and 10 mil (0.102 0.254 mm) or lower, for example, between about 2 and 6 mil (0.051 and 0.152 mm) in order to increase the amount of available internal volume. There is a greater tendency for the thin walled cathode casing to relax after crimping closes the cell. Such casing relaxation can result in the development or enlargement of microscopic pathways between the cathode catalytic assembly and the inside surface of cathode casing step, in turn providing a pathway for electrolyte leakage.

In commonly assigned U.S. Pat. No. 6,436,156 B1 a pad transfer method is disclosed for applying adhesive to the recessed annular step surrounding the raised terminal portion of the cathode casing of a zinc/air cell. The application of adhesive to the inside surface of the recessed step provides a tight seal between the cathode assembly and cathode casing of a zinc/air cell. The adhesive applied by pad transfer method prevents leakage of electrolyte around the edge of the cathode assembly and thus prevents electrolyte from escaping through air holes in the cathode casing.

SUMMARY OF THE INVENTION

An aspect of the invention is directed to a spray process for applying an adhesive sealant to components of an electrochemical cell. The adhesive is dispensed through a spray nozzle wherein the adhesive is applied in the form of a stream of droplets. In this regard the term "spray" or "jet spray" as used herein shall be understood to mean the dispensing of a liquid through a nozzle so that it dispenses in the form of a stream of droplets. It has been determined that liquid adhesive of appropriate viscosity can be dispensed employing conventional micro-dispense technology, similar to that of ink jet spray technology. Such methods include dispensing the liquid adhesive employing micro-dispense nozzles in connection with thermal or piezoelectric ink jet spray methods.

An aspect of the invention is directed to a method for dispensing the liquid adhesive in the form of micro droplets. This can be accomplished by employing a piezoelectric nozzle. Such nozzle employs a piezoelectric transducer, which surrounds a resilient capillary nozzle formed of a resilient capillary tube which terminates in an outlet opening. The tube is preferably of glass. The piezoelectric transducer converts electrical pulses to mechanical vibrations, which in turn results in the harmonic vibration of the capillary nozzle. The rate of droplet propagation is responsive to and set by the frequency of the transducer. The frequency can be set so very high so that the distance between droplets formed are so small that the droplets tend to merge and the droplet propagation thus emulates a steady-stream. The droplet size can be adjusted by adjusting the size of the nozzle opening. Two distinct modes of operation can be employed: a) intermittent pulse and b) continuous pulse mode. For intermittent pulse dispensing, a set number of droplets are propagated over a set application cycle time. The desired rate of droplet propagation for intermittent pulse mode is between about 500 and 5000 droplets per second, more typically between about 1000 and 3000 droplets per second. The rate of droplet propagation is set by presetting the transducer frequency to a set value between about 500 and 5000 hertz, which corresponds to a droplet propagation rate respectively of between about 500 and 5000 droplets per second. The propagation of droplets at a preset rate is allowed to continue for a predetermined cycle time to give a desired number of droplets be cycle. Such application cycle can be repeated on an additional substrate or on the same substrate to provided layered adhesive application. The pause time between application cycles of droplet propagation can be set on the order of a second, hundredths of a second, and even thousandth of a seconds, or longer or shorter periods in order to meet desired throughput requirements. Thus, the pause time between application cycles is typically between about 0.001 and 1 seconds. During the application cycle when droplets are being propagated at a rate between 500 and 5000 droplets per second, which corresponds to the 500 to 5000 Hertz setting of the transducer, the application time can on the order of a second, hundredths of a second, and even thousandths of a second, or longer or shorter times. Thus, the application time is typically between about 0.001 and 1 second. An example of such dispensing would be for a setting of 3000 Hertz (3000 droplets per second) and the need to dispense 580 droplets to cover a linear distance of substrate of 0.933 inches (corresponding to approximate inside circumference of size 13 button cell), the dispense time (application cycle) would be 0.193 seconds. With droplet propagation at a frequency above about 5000 hertz the droplets tend to merge thereby emulating a continuous stream, with imperceptible spaces between droplets.

For continuous pulse dispensing, the droplet propagation rate is desirably between about 500 and 5000 droplets per second, more typically between about 1000 and 3000 droplets per second. In continuous pulse mode distinct droplets are continuously propagated until the signal to the transducer is shut-off by user intervention. Although such microdispense technology is normally employed in dispensing ink, such as with ink jet printers, it has been determined herein that liquid adhesive can also be dispensed using such method. The liquid adhesive desirably has a viscosity of between about 4 and 20 centipoise. The liquid adhesive can be dispensed from a micro sized nozzle, (a nozzle having an outlet opening diameter between about 50 and 60 micron) so that the width of the adhesive coating on the target surface may be very narrow, (between about 10 and 25 mil (0.254 and 0.635 mm)). The thickness of the adhesive (wet) transferred to the target surface may typically be between about 20 and 40 micron (0.020 and 0.040 millimeter) and even higher. The thickness of the adhesive (dry) may typically be about 10 micron (0.010 mm) and even higher.

A preferred adhesive is a solvent-based solution comprising polyamide adhesive resin. The adhesive component is desirably a low molecular weight thermoplastic polyamide resin. Preferred polyamide resins are available under the tradenames REAMID-100 and VERSAMID-100 (from Henkel Corp. or Cognis Corp.). These resins are gels at room temperature that are dimerized fatty acids with molecular weights around 390 and are the reaction products of dimerized fatty acids and diamines. Although higher molecular weight polyamide based adhesive components can be used, the lower weight components are preferred since they are more readily dissolved in the preferred solvent of choice. The adhesive component is dissolved in a solvent to the desired viscosity. Various solvents can be used, such as isopropanol or toluene, as well as mixtures of solvents. The preferred embodiment uses isopropanol as the solvent of choice due to its relative benign nature. An additional advantage of polyamides is their resistance to chemical attack by potassium hydroxide electrolyte.

The adhesive can be effectively applied to electrochemical cell components employing the jet spray method. The adhesive can be applied to provide an adhesive seal between desired surfaces of polymer components, between surfaces of metallic components or between surfaces of polymer and metallic components for the cell. For example, the adhesive can be applied to provide an adhesive seal between a plastic insulating plug and outer casing of an electrochemical cell to seal the open end of a metallic or plastic casing of a cylindrical or flat (prismatic) alkaline cell. In such cells there is typically an elongated current collector (nail) which is inserted through the insulating plug so that its tip penetrates into one of the electrode mixtures. For example, in zinc/$MnO_2$ alkaline cells there is usually an elongated current collector nail inserted through an opening in the insulating plug so that it penetrates into the zinc anode mixture. Liquid adhesive can be applied around the surface of such current collector by the spray method of the invention so that an adhesive seal develops between the current collector and insulating plug. Alternatively, the sealant can be applied to the walls of the aperture in the insulating plug.

A particular aspect of the invention is directed a method of applying liquid adhesive by jet spray to a portion of the inside surface of a cathode casing for a zinc/air cell. The adhesive is applied, preferably by a piezoelectric nozzle, in the form of a stream of droplets. The stream of droplets can be applied to the inside surface of a recessed step, which extends from and surrounds a central positive terminal at the closed end of the cell's cathode casing. The adhesive, upon drying, acts as a sealant to prevent leakage of electrolyte from the cell. If the closed end of the cathode casing is flat, that is, does not have a recessed step, the adhesive can be applied by a stream of droplets to the inside surface of the closed end along or near its peripheral edge.

In commonly assigned U.S. Pat. No. 6,436,156 B1 a pad transfer method is described for applying adhesive to portions of the inside surface of the cathode casing of a zinc/air button cell. Although the pad transfer method of applying adhesive is effective, the jet spray method of the present invention is believed to have additional advantages. Specifically, the jet spray method is faster than the pad transfer method and therefore results in higher output in number of units per hour of adhesive coated product. The jet spray method is a non contact method, that is does not involve contact of a pad, brush or applicator surface in order to apply the adhesive to the target substrate surface. This reduces the chance of applying too much adhesive, which could result in oozing from the edge of the target surface edge resulting in air-hole blockage or poor electrical contact between the cathode catalytic assembly and the cathode casing. Also, in the jet spray method the fine spray of liquid adhesive droplets can be aimed very precisely to the target surface. This makes possible precise application of a thin coating of adhesive to narrow width surfaces as in the recessed step of a cathode casing or to other difficult to reach surfaces of cell components. In addition, this method allows for highly accurate and repeatable metering of dispensed sealant weight, which in turn leads to more effective sealant-use management in production. The jet spray method is also suitable for applying adhesive in layers if desired, wherein each layer may be composed of the same or different material to produce an adhesive laminate.

BRIEF DESCRIPTION OF THE DRAWINGS

The invention will be better understood with reference to the drawings in which.

DETAILED DESCRIPTION

The jet spray method of the invention may be used to apply adhesive to components of an electrochemical cell during assembly of the cell. Most cells include a plastic insulating plug, which is inserted into an open end of the cell casing (housing) to seal the cell and prevent electrical shorting. The casing is typically metallic. The adhesive may be applied between the edge of such insulating plug and the cell casing. A metallic current collector typically in the form of an elongated nail is inserted through an aperture in the insulating plug so that the tip of the current collector passes into the anode mixture. Adhesive may be applied by the jet spray method of the invention to the surface of current collector to produce an adhesive seal between the anode current collector and insulator plug.

In a particular application the adhesive may be applied by jet spray to portions of surfaces within the cathode casing (cathode can) of a zinc/air cell. In particular it has been determined that adhesive can be advantageously applied by jet spray to the inside surface of the closed end of the cathode casing (cathode can) of a zinc/air cell. In a specific embodiment the adhesive can be applied by the jet spray method to the peripheral recessed step surrounding the raised terminal contact portion of conventional cathode casing of zinc/air button cells. If the closed end of the cathode casing is flat, that is, does not have a recessed step, the adhesive sealant can be applied by jet spray to the inside surface of the closed end along, near or adjacent its peripheral edge.

It has been determined that jet spray nozzles typically employed in ink jet spray printing can be used to apply the adhesive to the desired components of an electrochemical cell. The adhesive has a viscosity that enables such application of ink jet spray technology to the present application. The nozzle size can be modified to openings somewhat larger or somewhat smaller than would be used in ink jet spray. Thus, it is not intended that the use of the term "jet spray" be limited to nozzle sizes conventionally employed in ink jet spray printing. The preferred jet spray method described herein employs the principles of ink jet spray technology with variation in nozzle size and operating parameters, and use of liquid adhesive instead of ink. The application of adhesive solutions to jet spray technology is believed to be counter-intuitive.

Figure 1:
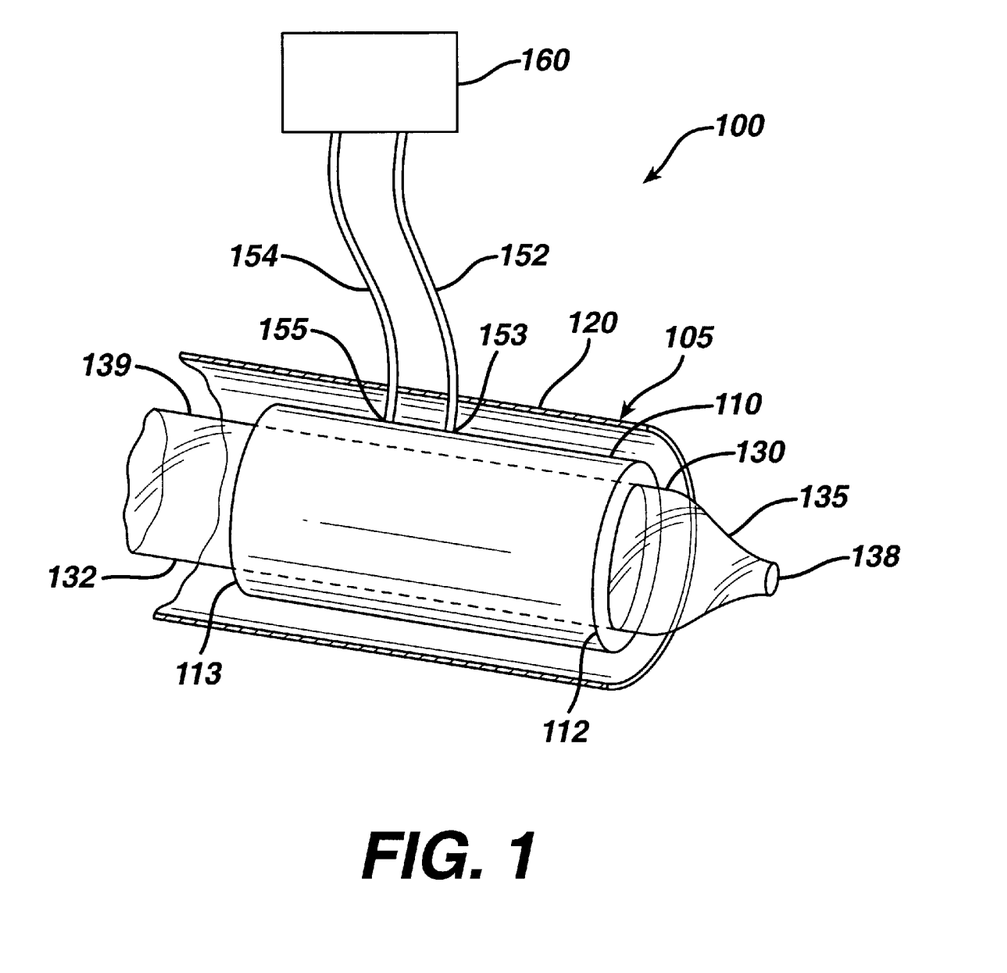
FIG. 1 is an isometric sectional view showing the jet spray nozzle.

A schematic of the jet spray system 100 is shown in FIG. 1. The nozzle assembly 105 comprises a nozzle 135 having a resilient glass capillary tube 130, surrounded by piezo-electric transducer (PZT) 110 and outer housing 120, desirably of aluminum. The glass capillary tube 130 has an elongated tubular body 132 which has a back end 139 connected to fluid supply source and a front end terminating in nozzle tip opening 138. The nozzle tip opening 138 can be varied in size depending on the size droplet desired. The system 100 includes a waveform frequency generator 160 which i s electrically connected to a piezoelectric transducer (PZT) through positive and negative connectors 152 and 154, respectively. The connections are made by way of junctions 153 and 155, respectively.

In operation the piezoelectric transducer 110 impulses at the frequency set i n the waveform generator 160. The piezoelectric impulse in turn causes the capillary tube 130 to be squeezed, that is, to pulse (vibrate) in harmony with the frequency applied by the transducer. The pulsation (vibration) of the capillary tube 130 causes a stream of liquid adhesive 143a (FIG. 2) to pass from nozzle tip 138 onto the target surface 245a to be coated. (Adhesive 143a may also be referred to herein as the adhesive sealant or sealant.) The stream 143a is transformed into a fine line of pulsed droplets 143b as it passes away from nozzle tip 138 to impact a target surface 245a. The droplet 143b size is desirably between about 1 and 100 micron.

In a preferred embodiment of the present invention the nozzle size and mode of operation of jet spray system 100 can be adjusted so that the droplet size is desirably between about 5 and 10 micron. In such mode it has been determined that the adhesive 143 can be sprayed to cover small surface areas with great precision. In one specific application, for example, it has been determined that the present jet spray system 100 can be used to apply adhesive 143 to desired portions of the inside surface of the cathode casing (can) 240 of a zinc/air button cell. The cathode casing 240 (FIG. 2) has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion 244 to the outer peripheral edge 248. Conventional zinc/air button cells can vary in diameter from between about 4 and 16 mm, more typically between about 4 and 12 mm. In such cells the annular recessed step 245 may typically have a width of about 30 mil (0.762 mm).

It has been determined that in employing the jet spray system 100 a continuous path of adhesive, for example, having a width of between about 10 and 25 mil (0.254 0.635 mm) can be applied to cover the recessed step inside surface 245*a* of cathode casing 240. In order to accomplish such application it has been determined that a nozzle tip opening 138 of between about 50 and 60 micron is desirable. Such nozzle is available as nozzle model number MJ-AT-01 from Microfab Technologies, Plano Texas. The nozzle tip 138 is desirably placed so that it is in a range between about 2 and 10 mm, preferably about 6 mm from the target surface 245a. The waveform generator 160 is set to pulse mode preferably to cause the piezoelectric transducer to impulse at a frequency of between about 500 and 5000 Hertz. This translates into a steady output of between about 500 and 5000 discrete droplets per second of liquid adhesive 143 emanating from nozzle 135. A more typical range of droplet propagation is between about 1000 and 3000 droplets per second, which corresponds to a transducer frequency of between about 1000 and 3000 Hertz. The average drop size may typically be between about 5 and 10 micron. (The term "average" as used herein shall be understood to be the arithmetic mean average.) The transducer dwell voltage is desirably set to between about 55 and 80 volts for viscosity of the liquid adhesive 143 being between about 4 and 20 centipoise, respectively. The lower the liquid adhesive viscosity the less the chance of nozzle tip 138 clogging but lower viscosity increases the application time, since there will be less adhesive resin dispensed per pulse. The viscosity of the liquid adhesive can be optimized depending on the type of adhesive resin employed in order to assure satisfactory operation. The cathode casing 240 (FIG. 2) is held in place on a rotating turret (not shown) so that a continuous stream of adhesive droplets 143b can be applied circumferentially onto the annular surface 245a while the cathode casing 240 is rotated one revolution. For typical cathode casing 240 having a diameter between about 4 and 12 mm the cathode casing 240 can be rotated one revolution at a speed typically between about 60 and 400 rotations per minute while liquid adhesive 143 is dispensed through spray nozzle 135. However, if desired, the cathode casing 240 can be rotated a multiple number of rotations to apply more than one layer of adhesive. Alternatively, to produce a continuous ring (bead) of adhesive the casing 240 can be held stationary and the nozzle 135 can be rotated one or more revolutions along the path of annular surface 245a. The width of adhesive sprayed onto the cathode casing recessed surface 245a may typically be between about 10 and 25 mil (0.254 and 0.635 mm). The thickness of the adhesive (wet) on the recessed surface 245a may be between about 20 and 40 micron (0.020 and 0.040 millimeter) and even higher. The thickness of the adhesive (dry) may be between 5 micron (0.005 mm) and 10 micron (0.010 mm) and even higher.

Figure 2:
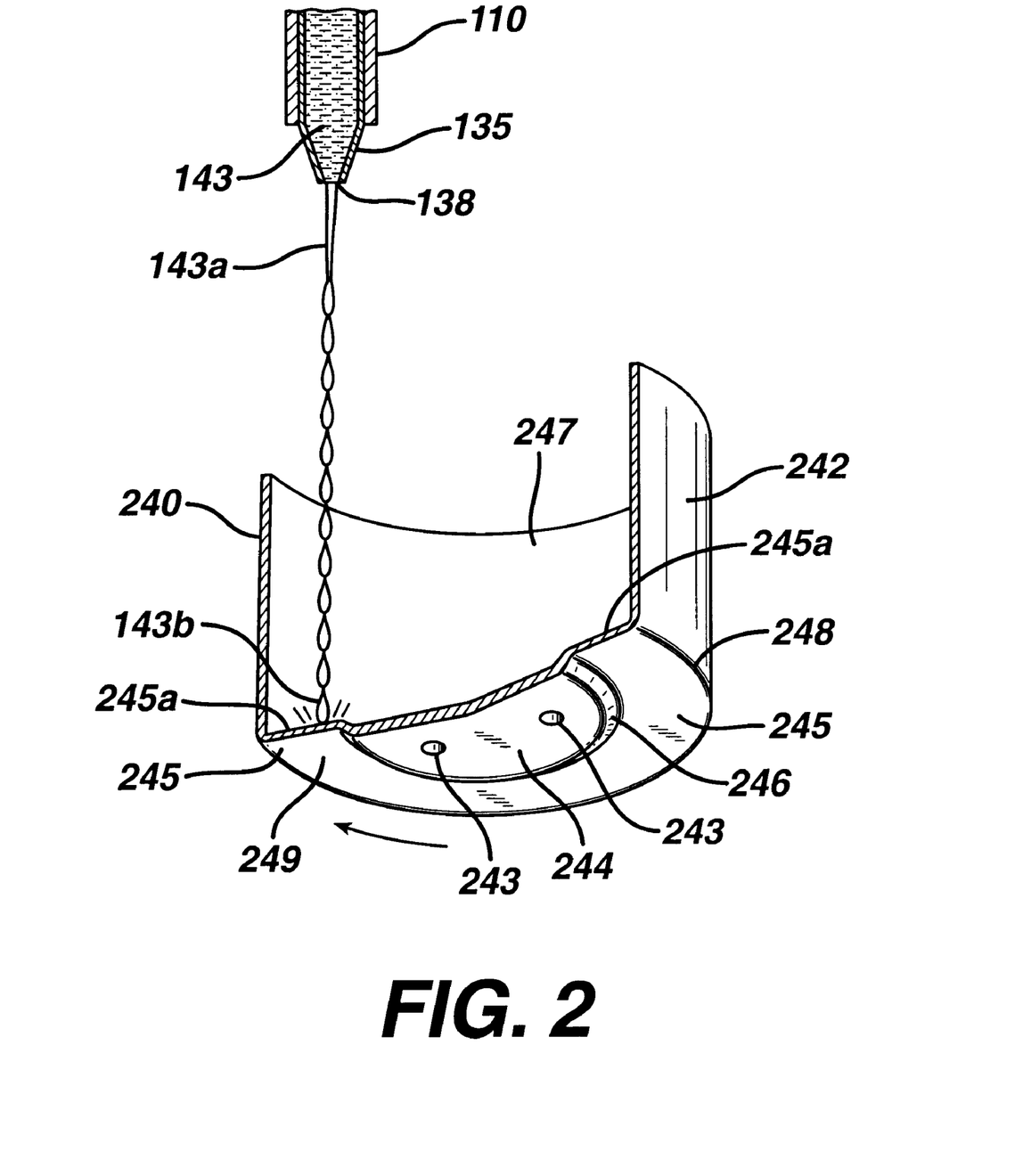
FIG. 2 is an isometric view showing the application of liquid adhesive dispensed from the jet spray nozzle to the recessed step at the closed end of the cathode casing for a zinc/air cell.

As the piezoelectric transducer pulses, the liquid adhesive 143 dispenses in a fine stream of droplets 143b which splatter somewhat upon contact with annular surface 245a. A continuous coating of adhesive is applied thereby to cover annular surface 245a as casing 240 rotates one revolution. It will be appreciated that variations are possible in that the adhesive stream may be pulsed so that there are gaps along the circumferential path of annular surface 245a devoid of adhesive.

The jet spray system 100 can be operated in a) intermittent pulse and b) continuous pulse mode. For intermittent pulse dispensing, a set number of droplets are propagated over a set application cycle time. The desired rate of droplet propagation for intermittent pulse mode is between about 500 and 5000 droplets per second, more typically between about 1000 and 3000 droplets per second. The rate of droplet propagation is set by presetting the transducer frequency to a set value between about 500 and 5000 hertz, which corresponds to a droplet propagation rate respectively of between about 500 and 5000 droplets per second. The propagation of droplets at a preset rate is allowed to continue for a predetermined cycle time to give a desired number of droplets per application cycle. Such application cycle can be repeated on an additional substrate or on the same substrate to provided layered adhesive application. The pause time between application cycles of droplet propagation can be set typically between about 0.001 and 1 seconds. During the application cycle when droplets are being propagated at a rate between 500 and 5000 droplets per second, which corresponds to the 500 to 5000 Hertz setting of the transducer, the application time is typically between about 0.001 and 1 second. An example of such dispensing would be for a setting of 3000 Hertz (3000 droplets per second) and the need to dispense 580 droplets to cover a linear distance of substrate of 0.933 inches (corresponding to circumferential distance of cathode casing recessed step 245a for size 13 zinc/air button cell), the dispense time (application cycle) would be 0.193 seconds. With droplet propagation at a frequency above about 5000 hertz the droplets tend to merge thereby emulating a continuous stream with imperceptible droplet separation.

Various liquid adhesives 143 can be dispensed through nozzles 135 employing the jet spray system 100. However, it has been determined that a liquid adhesive of low viscosity of between about 4 and 20 centipoise is desirable. Such viscosity range makes the dispensing of the desired droplet size, preferably between about 5 and 10 micron, more readily achievable employing a desired nozzle opening 138 size of between about 50 and 60 micron. The liquid adhesive 143 is preferably solvent-based adhesive solution comprising a polyamide resin, which dries to form a permanent adhesive bond with a contacting surface, as the solvent evaporates. In principle a solvent-based pressure sensitive adhesive could also be dispensed by the spray method herein described. A preferred polyamide adhesive resin is available under the trade designation VERSAMID resin from Specialty Chemicals (a division of Fuji Hunt Co.) Another preferred polyamide adhesive resin is available under the trade designation REAMID-100 from Specialty Chemicals. The VERSAMID or REAMID-100 resin is readily soluble in isopropylalcohol. Thus, a liquid adhesive solution 138 having the desired viscosity between about 4 and 20 centipoise can be obtained by adjusting the amount of isopropylalcohol solvent blended with the VERSAMID or REAMID-100 resin. A preferred blend as used in jet spray system 100 herein comprises 7 to 20 percent by weight adhesive resin solids and 80 to 93 percent by weight isopropylalcohol. Other solvent-based adhesive systems can be employed for liquid adhesive 143. For example, thermoplastic block copolymers such as styrene-isoprene-styrene, styrenebutadiene-styrene, styrene-ethylene/butylene-styrene, styreneethylene/propylene-styrene and mixtures thereof all dissolved in an appropriate solvent could be used.

Specific tests have been made with liquid adhesive 138 comprising VERSAMID or REAMID-100 which are solutions of polyamide adhesive resin dissolved in isopropylalcohol. Such adhesive solutions of viscosity between about 4 and 20 centipoise, namely, at 4.5, 5.8, 6.8, 11 and 14.5 and 19.8 centipoise were tested. The nozzle 138 diameter was about 60 micron. The transducer dwell voltage was set to about 75 volts. The pulse frequency was set at between about 500 and 5000 Hertz resulting in a dispensing rate of between about 500 and 5000 droplets per second, respectively. Nozzle 138 was set to a distance of about 6 mm from a target metal substrate. An adhesive coating of width between about 10 and 28 mil (0.254 and 0.711 mm) wide, typically about 17 mil wide (0.4318 mm) was obtainable.

The zinc/air cell has a metal anode, typically comprising zinc and an air cathode. The cell is commonly referred to as a metal/air depolarized cell. The zinc/air cell of the invention is desirably in the form of a miniature button cell. It has particular application as a power source for electronic hearing aids. The miniature zinc/air button cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between a bout 1.2 volt to 0.2 volt. The cell typically has a substantially flat discharge voltage profile between about 1.1 and about 0.9 volt whereupon the voltage can then fall fairly abruptly to zero. The miniature button cell can be discharged at a rate between about 0.2 and 25 milliAmp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size Zn/MnO$_2$ alkaline cells, and even larger. The present invention is also intended to be applicable to such larger cell sizes and also to other cell shapes, for example, prismatic or elliptical shapes.

The zinc/air cell can contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 50 parts per million parts of total cell weight, preferably less than 20 parts per million of total cell weight, more preferably less than about 10 parts per million of total cell weight. (The term "essentially mercury free" as used herein shall mean the cell has a mercury content less than about 50 parts per million parts of total cell weight.) The cell of the invention can have a very small amount of lead additive in the anode. If lead is added to the anode, the lead content in the cell can typically be between about 100 and 600 ppm of total metal content in the anode. However, the cell desirably does not contain added amounts of lead and thus can be essentially lead free, that is, the total lead content is less than 30 ppm, desirably less than 15 ppm of the total metal content of the anode.

The zinc/air cell 210 and components therein is the same or similar to that described in the specific embodiment in commonly assigned U.S. Pat. No. 6,436,156 B1 except that adhesive coating 143 is applied by the spray method of the present invention and the adhesive composition is as set forth in the present specification herein. The zinc/air cell 210 (FIG. 3) has an anode casing 260, a cathode casing 240, and electrical insulator material 270 therebetween. The anode casing 260 has body 263, an integral closed end 269, and an open end 267. The cathode casing 240 has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion to the outer peripheral edge 248.

Figure 3:
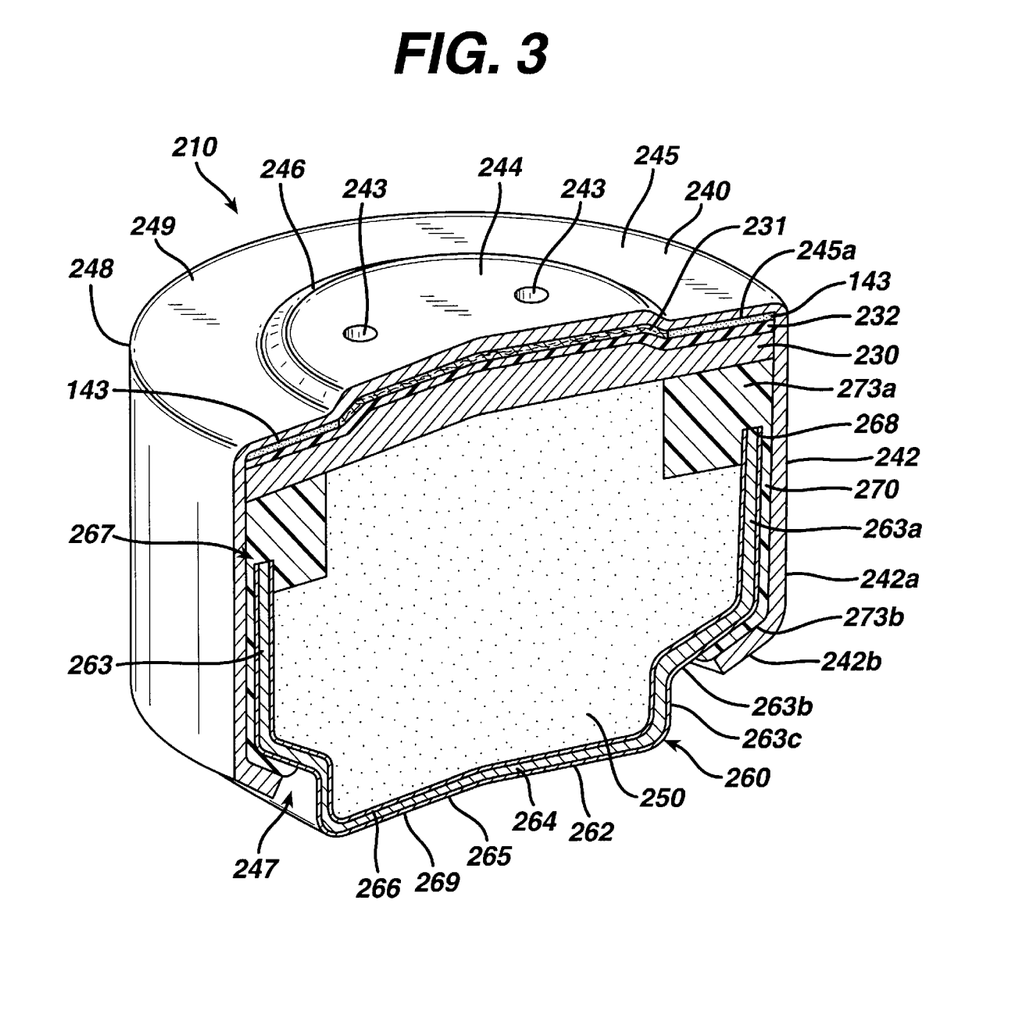
FIG. 3 is an isometric cross sectional view of an embodiment of the zinc/air cell of the invention with adhesive sealant.

The anode casing 260 contains an anode mixture 250 comprising particulate zinc and alkaline electrolyte. The particulate zinc is desirably alloyed with between about 100 and 1000 ppm indium. The cathode casing 240 has a plurality of air holes 243 in the raised portion 244 of its surface at the closed end thereof. A cathode catalytic assembly 230 containing a catalytic composite material 234 (FIG. 4) is placed within the casing proximate to the air holes. During cell discharge, the catalytic material 234 facilitates the electrochemical reaction with ambient oxygen as it ingresses through air holes 243. An adhesive sealant 143 is applied along a portion of the inside surface of cathode casing 240. In a preferred embodiment the adhesive is applied by the spray method of the invention as a continuous ring on the inside surface 245a of recessed annular step 245 at the closed end 249 of the casing as shown in FIGS. 2 3. If the closed end of the cathode casing is flat, that is, does not have a recessed step 245, the adhesive sealant 143 can be applied to the inside surface of the closed end 249 adjacent the outer peripheral edge 248 of said closed end. In such latter case the adhesive sealant 143 is desirably applied as a continuous ring to the inside surface of closed end 249 such that the continuous ring of adhesive 143 has an outside diameter of between about 75 percent and 100 percent, preferably between about 90 and 100 percent, more preferably between about 95 and 100 percent of the inside diameter of closed end 249. The adhesive ring is preferably narrow so that the majority of cathode material 234 is exposed to the incoming air supply. In addition, if adhesive is too thick, it can increase the resistance of the joint between the cathode material 234 and the cathode casing 240, which undesirably lowers the voltage provided to the device.

Figure 4:
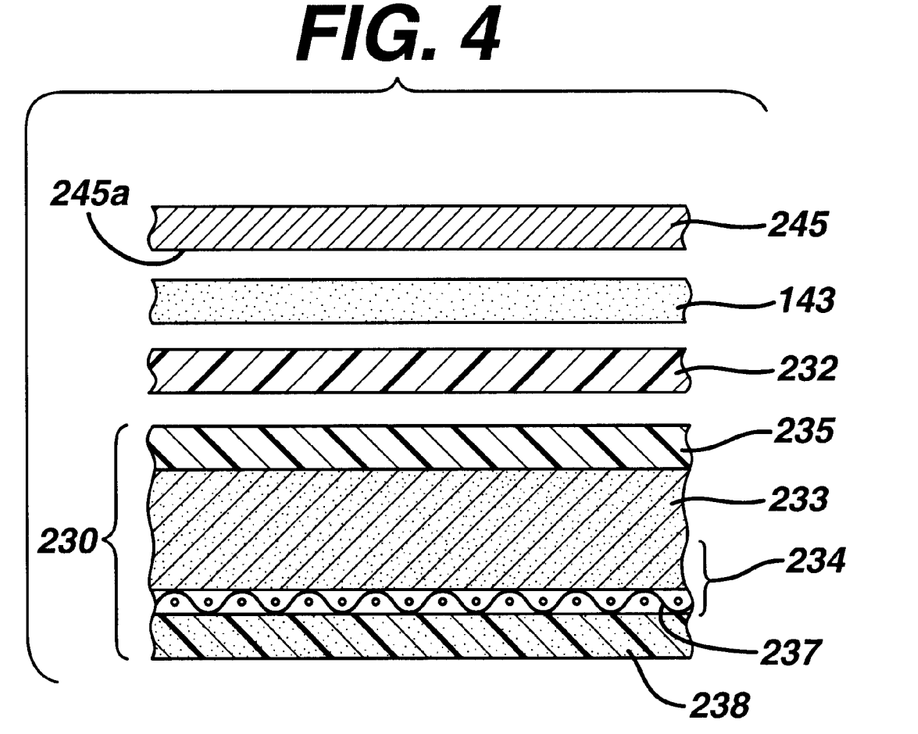
FIG. 4 is an exploded view of a preferred embodiment of the catalytic cathode assembly and adhesive sealant shown in FIG. 3.

A cathode catalytic assembly 230 (FIGS. 3 and 4) can be formed by laminating a layer of electrolyte barrier film material 235, preferably Teflon (tetrafluoroethylene), to one side of the catalytic composite material 234 and an ion permeable separator material 238 to the opposite side. The electrolyte barrier film 235, preferably of Teflon, has the property that it is permeable to air, yet is hydrophobic, and prevents electrolyte from passing therethrough. The edge of cathode catalytic assembly 230 can be applied to said adhesive ring 143 on step 245 thereby providing a permanent adhesive seal between the cathode composite 234 and casing step 245. In a specific embodiment the cathode catalytic assembly 230 can be applied to adhesive 143 on step 245 with the electrolyte barrier 235 contacting the adhesive. In a preferred embodiment a separate electrolyte barrier sheet 232, preferably of Teflon, can be applied to adhesive ring 143 on the inside surface of step 245, thereby bonding electrolyte barrier sheet 232 to the inside surface 245a of step 245. The catalytic assembly 230 can then be applied over electrolyte barrier sheet 232, preferably with the surface of second electrolyte barrier sheet 235, preferably of Teflon, contacting the barrier sheet 232 (FIG. 4). The barrier sheet 232 when bonded with adhesive 143 to the inside surface of step 245, particularly in combination with a second barrier sheet 235 (FIG. 4) being applied against barrier sheet 232, provides a very effective seal preventing electrolyte from migrating around the edge of catalytic assembly 230 and gradually leaking out of air holes 243. The use of adhesive sealant 143 also reduces the amount of crimping force needed during crimping the outer peripheral edge 242b over the anode casing body. This is particularly advantageous when thin walled casings thickness such as between about 0.001 inches (0.0254 mm) and 0.015 inches (0.38 mm), typically between about 0.002 inches (0.0508 mm) and 0.010 inches (0.254 mm) or thin catalytic cathode assemblies 230 are employed, since high crimping forces could possibly distort or crack such thin casings and cathode assemblies.

A preferred embodiment of a zinc/air cell of the invention is shown in FIG. 3. The embodiment shown in FIG. 3 is in the form of a miniature button cell. The cell 210 comprises a cathode casing 240 (cathode cup) an anode casing 260 (anode cup) with an electrical insulator material 270 therebetween. The insulator 270 can desirably be in the form of a ring, which can be inserted over the outside surface of the anode casing body 263 as shown in FIG. 3. Insulator ring 270 desirably has an enlarged portion 273a extending beyond peripheral edge 268 of the anode casing (FIG. 3). The insulator 270 with enlarged portion 273a prevents anode active material from contacting the cathode casing 240 after the cell is sealed. Insulator 270 is of a durable electrically insulating material such as high density polyethylene, polypropylene or nylon which resists flow (resists cold flow) when squeezed.

The anode casing 260 and cathode casing 240 are initially separate pieces. The anode casing 260 and cathode casing 240 are separately filled with active materials, whereupon the open end 267 of the anode casing 260 can be inserted into the open end 247 of cathode casing 240. The anode casing 260 is characterized by having a first straight body potion 263a of maximum diameter which extends vertically downwardly (FIG. 3) from peripheral edge 268 to a point which is more than at least 50% of the anode casing 260 height where upon the casing is slanted inwardly to form slanted midportion 263b. There is a second straight portion 263c extending vertically downwardly from the terminal end of midportion 263b. The second straight portion 263c is of smaller diameter than straight portion 263a. The portion 263c terminates with a 90° bend forming the closed end 269 having a relatively flat negative terminal surface 265. The body 242 of cathode casing 240 ha s a straight portion 242a of maximum diameter extending vertically downwardly from closed end 249. The body 242 terminates in peripheral edge 242b. The peripheral edge 242b of cathode casing 240 and underlying peripheral edge 273b of insulator ring 270 are initially vertically straight and can be mechanically crimped over the slanted midportion 263b of the anode casing 260. This locks the cathode casing 240 in place over the anode casing 260 and forms a tightly sealed cell.

Anode casing 260 can be separately filled with anode active material by first preparing a mixture of particulate zinc and powdered gellant material. The zinc average particle size is desirably between about 30 and 350 micron. The zinc can be pure zinc but is preferably in the form of particulate zinc alloyed with indium (100 to 1000 ppm). The zinc can also be in the form a particulate zinc alloyed with indium (100 to 1000 ppm) and lead (100 to 1000 ppm). Other alloys of zinc, for example, particulate zinc alloyed with indium (100 to 1000 ppm) and bismuth (100 to 1000 ppm) can also be used. These particulate zinc alloys are essentially comprised of pure zinc and have the electrochemical capacity essentially of pure zinc. Thus, the term "zinc" shall be understood to include such materials. The gellant material can be selected from a variety of known gellants which are substantially insoluble in alkaline electrolyte. Such gellants can, for example, be cross linked carboxymethyl cellulose (CMC); starch graft copolymers, for example in the form of hydrolyzed polyacrylonitrile grafted unto a starch backbone available under the designation Waterlock A221 (Grain Processing Corp.); cross linked polyacrylic acid polymer available under the trade designation Carbopol C940 (B.F. Goodrich); alkali saponified polyacrylonitrile available under the designation Waterlock A 400 (Grain Processing Corp.); and sodium salts of polyacrylic acids termed sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 250 can be inserted into the anode casing 260. Alternatively, the dry powder mix of particulate zinc and gellant can be first placed into the anode casing 260 and the electrolyte solution added to form the wet anode mixture 250.

A catalytic cathode assembly 230 (FIGS. 3 and 4) and air diffuser 231 can be inserted into casing 240 as follows: An air diffuser disk 231 (FIG. 3), which can be in the form of an air porous filter paper or porous polymeric material can be inserted into the cathode casing 240 so that lies against the inside surface of the raised portion 244 of the casing against air holes 243. An adhesive sealant ring 143 is applied to the inside surface of recessed step 245 at the closed end of the cathode casing. A separate electrolyte barrier layer 232 (FIGS. 3 and 4), for example, of polytetrafluroethylene (Teflon) can optionally be inserted over the air diffuser 231 so that the edge of the barrier layer 232 contacts adhesive ring 143. Barrier layer 232 is permeable to air but not permeable to the alkaline electrolyte or water. The adhesive ring 143 thus permanently bonds the edge of barrier layer 232 to the inside surface of recessed step 245. The adhesive ring 143 with barrier layer 232 bonded thereto prevents electrolyte from migrating from the anode to and around cathode catalytic assembly 230 and then leaking from the cell through air holes 243. A catalytic cathode assembly 230 as shown in FIG. 4 can be prepared as a laminate comprising a layer of electrolyte barrier material 235, a layer of cathode catalyst composite 234 under the barrier layer 235 and a layer of ion permeable separator material 238 under the catalyst composite 234, as shown in FIG. 4. The separator 238 can be selected from conventional ion permeable separator materials including cellophane, polyvinylchloride, acrylonitrile, and microporous polypropylene. Each of these layers can be separately prepared and laminated together by application of heat and pressure to form the catalytic assembly 230. The electrolyte barrier layer 235 can desirably be of polytetrafluroethylene (Teflon). The catalytic assembly 230 can then be applied over electrolyte barrier sheet 232 (FIG. 4), preferably with the surface of barrier (Teflon) sheet 235 contacting the barrier sheet 232.

Catalytic cathode composite 234 desirably comprises a catalytic cathode mixture 233 of particulate manganese dioxide, carbon, and hydrophobic binder which is applied by conventional coating methods to a surface of an electrically conductive screen 237, preferably a nickel mesh screen. Other catalytic materials may be included or employed such as metals like silver, platinum, palladium, and ruthenium or other oxides of metals or manganese ($MnO_x$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The manganese dioxide in catalytic mixture 233 can also be manganese dioxide formed from the thermal decomposition of manganese nitrate $Mn(NO_3)_2$. The carbon used in preparation of mixture 233 can be in various forms including graphite, carbon black and acetylene black. A preferred carbon is carbon black because of its high surface area. A suitable hydrophobic binder can be polytetrafluroethylene (Teflon). The catalytic mixture 233 may typically comprise between about 5 and 15 percent by weight $MnO_2$, 30 and 50 percent by weight carbon, and remainder binder. During cell discharge the catalytic mixture 233 acts primarily as a catalyst to facilitate the electrochemical reaction involving the incoming air. However, additional manganese dioxide can be added to the catalyst and the cell can be converted to an air assisted zinc/air or air assisted alkaline cell. In such cell, which can be in the form of a button cell, at least a portion of manganese dioxide becomes discharged, that is, some manganese is reduced during electrochemical discharge along with incoming oxygen. The adhesive ring 143 and method of application herein described is intended to be applicable for use as well in such air assisted cells to prevent leakage of electrolyte therefrom.

After the air diffuser 231 and catalytic assembly 230 are inserted into casing 240 with either barrier layer 235 or alternatively barrier layer 232 adhered to adhesive ring 143, the anode casing 260 is filled with anode material 250. The open end 267 of the filled anode casing 260 can be inserted into the open end 247 of cathode casing 240. The peripheral edge 242b of the cathode casing can be crimped over the slanted midportion 263b of the anode casing with insulator 270 therebetween, as above described.

In the preferred embodiment (FIG. 3) the anode casing 260 has a layer of copper 266 plated or clad on its inside surface so that in the assembled cell the zinc anode mix 250 contacts the copper layer. The copper plate is desired because it provides a highly conductive pathway for electrons passing from the anode 250 to the negative terminal 265 as the zinc is discharged. The anode casing 260 is desirably formed of stainless steel, which is plated on the inside surface with a layer of copper. Preferably, anode casing 260 is formed of a triclad material composed of stainless steel 264 with a copper layer 266 on its inside surface and a nickel layer 262 on its outside surface as shown in FIG. 3. Thus, in the assembled cell 210 the copper layer 266 forms the anode casing inside surface in contact with the zinc anode mix 250 and the nickel layer 262 forms the anode casing's outside surface.

The copper layer 266 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 260 composed of the triclad material can be desirably between about 0.001 inches (0.0254 mm) and 0.015 inches (0.38 mm).

A miniature zinc/air cell can then be prepared having the components as above described (FIG. 3) including adhesive ring 143 on the inside surface of step 245. A separate electrolyte barrier layer 232 of Teflon can be bonded to the inside surface of step 245 using adhesive ring 143. By way of a specific example (not intended to be limiting as to cell size), the cell can be a standard size 635 zinc/air cell have an overall diameter of about 0.608 inches (15.4 mm) and a height (positive to negative terminal) of about 0.314 inches (7.98 mm). (Such dimensions are within the standards for such size cell as set by the International Electrochemical Commission—IEC.) The cathode casing 240 can be nickel plated steel having a wall thickness of about 0.01 inches (0.25 mm). The cathode catalyst composite 237 can have the following composition: $MnO_2$ 4.6 wt. %, carbon black 15.3 wt %, Teflon binder 18.8 wt. %, and nickel mesh screen, 61.2 wt. %. The total cathode catalyst composite 237 can be 0.140 g. The anode 250 can contain zero added mercury (mercury content can be less than 20 ppm of cell weight) and can have the following composition: zinc 77.8 wt % (the zinc can be alloyed with 200 to 500 ppm each of indium and lead), electrolyte (35–40 wt % KOH and 2 wt % ZnO) 21.9 wt. %, gelling agent (Waterlock J-550) 0.3 wt %, lead 400 ppm (0.04 wt %). The total anode 250 (zinc/gelling agent mix plus electrolyte) can be 2.43 g of which the zinc/gelling agent mix weight is approximately 1.9 g.

By way of another specific non limiting example, the cell size could be a standard size 312 zinc/air cell having an outside diameter of between about 0.3025 and 0.3045 inches (7.68 and 7.73 mm) and a height of between about 0.1300 and 0.1384 inches (3.30 and 3.52 mm). The casing 240 wall thickness for both size cells can be, for example, 0.004 inches (0.10 mm). The composition of the 312 size cell can be as above described with reference to the 635 size cell except that the total amount of active material would be adjusted to the volume of the 312 cell size. The process of the invention of applying sealant 143 and the preferred width and thickness of the adhesive sealant (wet and dry) as described herein can apply equally as well to such different cell sizes. As above indicated the process of the invention is desirably applicable to miniature zinc/air button cells typically having a disk-like cylindrical shape of diameter between about 4 and 16 mm, preferably between about 4 and 12 mm and a height between about 2 and 9 mm, preferably between about 2 and 6 mm.

Various factors can affect the probability for clogging the nozzle orifice. The adhesive sealant is preferably dispensed in the form of a solution. This reduces the chance of clogging due to suspended solids. The lower the viscosity of the sealant solution, the less likely that clogging will occur. The selection of solvent also affects the probability of clogging. If dispensing sealant is carried out in intermittent pulse mode and the solvent is extremely volatile, there is a greater chance of some clogging at the nozzle tip during the brief rest periods between dispense cycles. Dispensing sealant in continuous pulse mode reduces the risk of clogging since the sealant mixture at the nozzle tip is continuously replaced (moving) and clogging due to evaporation is not possible. In addition, transducer frequency and voltage can affect the probability of clogging. Higher frequencies produce a higher rate of droplet propagation, which can reduce the chance of clogging. Higher voltages deliver higher energies (higher droplet velocity), which also reduces the chance of clogging.

It has been determined that it can be beneficial to dispense the adhesive solution 143 with one nozzle 135 in operation while a second like nozzle is idle. In this manner if clogging of the first nozzle 135 occurs during the dispense operation, the second nozzle with its own adhesive solution supply 143, can be switched into service while the first nozzle is purged. The purging process is simple and effective. It can be quickly accomplished by connecting a gas supply such as air or inert gas supply (not shown) at elevated pressure to the adhesive solution in the nozzle or to an adhesive solution supply reservoir connected to the nozzle, thereby forcing pressurized air into the solution. The air may be at an elevated pressure of only about 10 to 15 psig, but air pressures, for example, up to about 50 psig or even higher pressures up to about 100 psig or higher can be employed. The pressurized air forces the adhesive solution out of the nozzle tip 138 in a continuous stream thereby unclogging the nozzle. The purge time is generally brief, for example, about 5 seconds. The unclogged first nozzle 135 is then ready to be activated into service should the second nozzle clog.

It has been determined that the above described multiple nozzle system can be employed to resolve or counteract any problem of nozzle clogging, with essentially no significant interruption in the overall dispense operation. The dispense operation can be in essentially continuous operation in this manner for long periods, for example, at least 24 hours or longer periods. The dispense operation itself can be run in either intermittent pulse or continuous pulse mode. For example, the process of the invention employing dual nozzles (one dispensing while the other is idle) can be in continuous operation in intermittent pulse mode. Such intermittent pulse mode can desirably be operated at droplet propagation rates between about 500 and 5000 droplets per second, more typically between about 1000 and 3000 droplets per second for application cycle time between about 0.001 and 1 second with pause time between application cycles between about 0.001 and 1 second. The nozzle orifices size is desirably between about 50 and 60 micron. The adhesive solution viscosity is desirably between about 4 and 20 centipoise. Alternatively, the process of the invention employing dual nozzles (one dispensing while the other is idle) can be in operation in continuous pulse mode. The continuous pulse mode can desirably be operated at droplet propagation rates between about 500 and 5000 droplets per second, more typically between about 1000 and 3000 droplets per second. The nozzle orifices size can desirably be between about 50 and 60 micron. The adhesive solution desirably has a viscosity between about 4 and 20 centipoise.

Although the invention has been described with reference specific embodiments, it should be appreciated that other embodiments are possible without departing from the concept of the invention. Thus, the invention is not intended to be limited to the specific embodiments but rather the claims and equivalents reflect its scope.

What is claimed is:

1. A method of applying a liquid adhesive to a portion of the surface of an electrochemical cell component, said liquid adhesive comprising a thermoplastic polyamide resin, comprising:

spraying said adhesive through a piezoelectric actuated nozzle to coat a portion of said surface with said adhesive.

2. The method of claim 1 comprising activating said spray nozzle by a piezoelectric transducer causing said nozzle to pulse and passing said adhesive therefrom in the form of droplets.

3. The method of claim 2 wherein said nozzle comprises a resilient tube comprising an elongated body terminating in an outlet opening, said piezoelectric transducer surrounding said elongated body causing said elongated body to pulse and pass said liquid adhesive from said nozzle in the form of droplets.

4. The method of claim 3 wherein said adhesive is liquid and passes from said nozzle at the rate of between about 500 and 5000 droplets per second.

5. The method of claim 1 wherein said adhesive is a liquid having a viscosity of between about 4 and 20 centipoise.

6. A method of applying a liquid adhesive to a portion of the inside surface of the casing for an electrochemical cell, comprising:

passing liquid adhesive through a piezoelectric actuated spray nozzle to coat a portion of the inside surface of said casing with said adhesive, said adhesive comprising a thermoplastic polyamide resin.

7. The method of claim 6 wherein said adhesive passes from said nozzle in the form of droplets.

8. The method of claim 6 comprising activating said spray nozzle by a piezoelectric transducer causing said nozzle to pulse and pass said liquid adhesive therefrom in the form of droplets.

9. The method of claim 8 wherein said nozzle comprises a resilient tube comprising an elongated body terminating in an outlet opening, said piezoelectric transducer surrounding said elongated body causing said elongated body to pulse and pass said liquid adhesive from said nozzle in the form of droplets.

10. The method of claim 9 wherein said liquid adhesive passes from said nozzle at the rate of between about 500 and 5000 droplets per second.

11. The method of claim 9 wherein said liquid adhesive has a viscosity between about 4 and 20 centipoise.

12. A method of applying a liquid adhesive to a portion of the inside surface of the cathode casing for a zinc/air cell, comprising:

passing liquid adhesive comprising a thermoplastic polyamide resin through a piezoelectric actuated spray nozzle to coat a portion of the inside surface of said cathode casing with said adhesive, wherein the cathode casing is in the form of a can having an open end and a closed end, wherein a central portion of the closed end forms the cell's positive terminal and said positive terminal is surrounded by a recessed annular step and said liquid adhesive passes from said nozzle to the inside surface of said recessed annular step.

13. A method of applying a liquid adhesive to a portion of the inside surface of the casing for an electrochemical cell, comprising:

passing liquid adhesive through a nozzle forming a spray of adhesive droplets to coat a portion of the inside surface of said casing with said adhesive droplets, said adhesive comprising a thermoplastic polyamide resin.

14. The method of claim 13 wherein said thermoplastic polyamide resin is the reaction product of dimerized fatty acids and diamines.

15. The method of claim 12 wherein said liquid adhesive has a viscosity of between about 4 and 20 centipoise.

16. The method of claim 12 wherein said liquid adhesive passes from said nozzle in the form of droplets, said liquid adhesive comprising a thermoplastic polyamide resin being the reaction product of dimerized fatty acids and diamines.

17. The method of claim 12 comprising activating said spray nozzle by a piezoelectric transducer causing said nozzle to pulse and pass said liquid adhesive therefrom in the form of droplets.

18. The method of claim 17 wherein said nozzle comprises a resilient tube comprising an elongated body terminating in an outlet opening, said piezoelectric transducer surrounding said elongated body causing said elongated body to pulse and pass said liquid adhesive from said nozzle in the form of droplets.

19. The method of claim 18 wherein said liquid adhesive passes from said nozzle at the rate of between about 500 and 5000 droplets per second.

20. The method of claim 19 wherein the average drop size is between about 5 and 10 micron.

21. The method of claim 18 wherein said nozzle outlet opening is located a distance between about 2 and 10 mm from said portion of inside surface of the cathode casing being coated with adhesive.

22. The method of claim 18 wherein said liquid adhesive from said nozzle coats said surface with said adhesive having a coating width between about 10 and 25 mil (0.254 and 0.635 mm).

23. The method of claim 18 wherein said resilient tube is of glass.

24. The method of claim 12 further comprising applying a portion of an electrolyte barrier sheet to the adhesive on the inside surface of said step.

25. The method of claim 24 wherein the electrolyte barrier sheet is of Teflon (tetrafluoroethylene).

26. The method of claim 24 wherein the edge of the barrier sheet is applied to the adhesive on the inside surface of said step and the edge of the barrier sheet becomes bonded thereby to the inside surface of said step.

27. The method of claim 26 wherein a catalytic cathode comprising manganese dioxide is applied over the electrolyte barrier sheet so that the barrier sheet is between the inside surface of said step and the catalytic cathode.

28. The method of claim 12 wherein said cell is a button cell and said step is an integral portion of the cathode casing.

29. The method of claim 28 wherein the step is in the form of an annular ring and the adhesive coat is in the form of a continuous ring conforming to the shape of said step.

30. The method of claim 12 further comprising purging said nozzle with a gas to unclog the nozzle and passing said liquid adhesive through another spray nozzle to coat a portion of the inside surface of said cathode casing with said adhesive.

31. The method of claim 30 wherein said gas is an inert gas.

32. The method of claim 30 wherein said gas is air.

* * * * *